(12) United States Patent
Ray (10) Patent No.: US 7,469,630 B1
(45) Date of Patent: Dec. 30, 2008

(54) STEAMER AND SMOKER ACCESSORY FOR A BARBECUE GRILL

(76) Inventor: Joseph A. Ray, 1280 Kentland Dr., King, NC (US) 27021

( * ) Notice: Subject to any disclaimer, the term of this patent is extended or adjusted under 35 U.S.C. 154(b) by 666 days.

(21) Appl. No.: 11/150,808

(22) Filed: Jun. 13, 2005

(51) Int. Cl.
*A23B 4/044* (2006.01)
*A47J 37/12* (2006.01)

(52) U.S. Cl. .......................... 99/482; 99/416
(58) Field of Classification Search ........... 99/400–417, 99/444–450, 473–482; 126/25 R, 39 R, 41 R, 126/19 R, 20
See application file for complete search history.

(56) References Cited

U.S. PATENT DOCUMENTS

| | | | |
|---|---|---|---|
| 1,674,469 A | * | 6/1928 | Hardie .................... 126/351.1 |
| 1,955,289 A | * | 4/1934 | Greenfield ................. 426/510 |
| 4,773,319 A | | 9/1988 | Holland |
| 5,167,183 A | | 12/1992 | Schlosser et al. |
| 5,301,606 A | * | 4/1994 | Ferguson .................... 99/482 |
| 5,501,142 A | | 3/1996 | Bailey |
| 6,102,028 A | | 8/2000 | Schlosser et al. |
| D430,772 S | | 9/2000 | Ganard |
| 6,257,130 B1 | | 7/2001 | Schlosser |
| 6,314,868 B1 | * | 11/2001 | Christensen et al. .......... 99/340 |
| 6,431,164 B1 | * | 8/2002 | Wardell ........................ 126/5 |

* cited by examiner

*Primary Examiner*—Sang Y Paik (57) ABSTRACT

A steamer and smoker accessory for generating a selected quantity of steam upwardly into a cooking section of a barbecue grill includes a reservoir including a base member and a lid tightly and securely fastened directly thereto. A plurality of rigid exhausts are directly conjoined to the lid and are in fluid communication with the base member such that the steam is directed upwardly. A flexible conduit having opposed end portions is directly connected to a gas supply source and the steam generating mechanism respectively. The accessory further includes a serrated layer for receiving foodstuff thereon during operating conditions and a plurality of smokers. The serrated layer further includes a plurality of oppositely seated support tabs for supporting the smokers. The plurality of smokers have a substantially cylindrical shape and a plurality of apertures spaced about an outer surface and extending along a length thereof.

8 Claims, 6 Drawing Sheets

FIG. 9

STEAMER AND SMOKER ACCESSORY FOR A BARBECUE GRILL

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cooking accessories and, more particularly, to a steamer and smoker accessory for barbecue grills.

2. Prior Art

Grilling or barbecuing food, such as with a conventional outdoor grill, has become very popular. One reason for its popularity is that outdoor or even indoor grilling imparts a unique and desired taste to the prepared food. In particular, meats, vegetables and a variety of other foods are grilled to have a different taste that is not achieved when the foods are prepared in a conventional way, such as with a stove or oven or in a frying pan.

Generally, outdoor grills or barbecues, as they are sometimes called, comprise an oven-like housing which contains a food support or grilling surface. The grilling surface includes a plurality of spaced bars, usually metal, which are parallel or crisscrossed to form a grill-like surface. Hence, the grill also includes a heating element to heat and cook food placed on the cooking surface. Generally, the heating element of a grill comprises a plurality or bed of briquettes which are heated by a flame to radiate heat to the food on the grilling surface. When grilling, the radiated heat normally passes directly to the food through the grill bars, without being obstructed.

One drawback to grilling food, however, is that the food may be dried out or overcooked due to the direct heat of the grill which is not as easily controlled as the heat from a stove or oven. Furthermore, the drippings from the food cause flaming which sears the food further drying it and sealing it to prevent the desired thorough cooking of the food.

It is often desirable when grilling food, to impart a unique flavor to the food which is different and in addition to that flavor imparted by the grilling and the food's own natural juices. This is done by steaming or smoking the food while it cooks with a uniquely flavored steam or smoke. The flavored steam or smoke created by the heat of the grill permeates the food and imparts a unique taste thereto. Mesquite wood chips are sometimes burned while grilling to impart the flavor of the wood smoke to the meat.

However, it may be desirable to provide other unique flavorings to the food, such as from a favorite liquid or sauce. Some flavoring can be accomplished by hand basting the food with the liquid or sauce as it cooks. However, basting requires continual attention to the basting process at regular intervals which is both inconvenient and messy. Further, hand basting may be uncomfortable and even dangerous, as the basting liquid must be applied to the food often over an open flame or heated briquettes. Additionally, too little basting, or late basting after the food is seared and cooked a certain amount, leaves the food dehydrated and only slightly flavored or smoked.

Several prior art devices have been utilized to periodically or continuously baste or steam food cooked in a grill. The prior art basting structures are complicated and expensive, while the prior art steamer devices prevent the desired flavoring of the food that is associated with the food's own natural juices by capturing the drippings which normally fall onto the heated briquettes to vaporize or burn.

Accordingly, a need remains for an inexpensive, simple and effective way to steam or smoke food cooked on a grill to impart a unique flavor from a favorite liquid or sauce. There is further a need for a way to flavor the food while allowing the natural juices of the food to also participate in the flavoring. The present invention satisfies such a need by providing a grill accessory capable of steaming, smoking, marinating and tenderizing foods. Such an accessory prevents meats from drying out, thus contributing to a more enjoyable meal.

BRIEF SUMMARY OF THE INVENTION

In view of the foregoing background, it is therefore an object of the present invention to provide a steamer and smoker accessory for allowing a user to simultaneously barbecue and smoke foodstuff on an outdoor grill. These and other objects, features, and advantages of the invention are provided by a device including a mechanism for generating a selected quantity of steam upwardly into a cooking section of a barbecue grill such that the foodstuff will become saturated with the steam during cooking operations. Such a steam generating mechanism includes a reservoir including a base member and a lid tightly and securely fastened directly thereto. The lid maintains an air tight relationship with the base member for preventing pressurized steam from escaping the base member.

A plurality of rigid exhausts are directly conjoined to the lid and are in fluid communication with the base member such that the steam is directed upwardly. A flexible conduit having opposed end portions is directly connected to a gas supply source and the steam generating mechanism respectively.

A pressure gauge is operably attached with the lid for measuring the steam pressure during operating conditions and a controller is operably connected to the conduit such that the user can selectively adjust a temperature of the steam as desired during cooking operations. Such a controller extends outwardly and is readily accessible by the user.

The device further includes a serrated layer for receiving foodstuff thereon during operating conditions and a plurality of smokers. The serrated layer includes a plurality of juxtaposed and spaced angle members having a substantially pyramid shape directly conjoined such that a linear opening runs along a longitudinal axis thereof and between the angle members. The serrated layer further includes a plurality of oppositely seated support tabs for supporting the smokers.

The plurality of smokers have a substantially cylindrical shape and a plurality of apertures spaced about an outer surface and extending along a length thereof. Such smokers receive a plurality of wood chips therein for adding flavor to foodstuff.

In an alternate embodiment, the device includes a frame positioned on a ground surface and having a centrally disposed longitudinal axis. Such a frame includes a planar platform sized and shaped for extending along an entire longitudinal length of the frame and centrally registered with the axis. The frame further includes a plurality of wheels directly connected thereto and positioned adjacent the platform for assisting the user to readily transport the device between remote locations. A cooking section is directly mounted on the frame and receives the foodstuff thereon during operating conditions.

In such an embodiment, the device further includes a mechanism for selectively generating a flame for cooking the foodstuff seated in the cooking section and a mechanism for generating a selected quantity of steam upwardly into the cooking section such that the foodstuff will become saturated with the steam during cooking operations.

A gas supply source is supported on the platform and positioned beneath the cooking section. Such a gas supply source is independently and directly connected to the steam generating mechanism and the flame generating mechanism respectively such that a user can independently control the quantity of steam and flames supplied to the cooking section.

The cooking section has a barrel shape to better accommodate large meats and foodstuff such as turkeys and chickens, and includes a unitary body provided with an access door pivotally and directly connected thereto. The body has a plurality of linear slots formed along a bottom region thereof and extending parallel to the axis. An air intake port is situated on one end portion of the body for channeling fresh air into a cavity of the body. A flue is directly connected to another end portion of the body for conveying stagnant air out of the body during cooking operations. Such a flue has an elbow shape directed upwardly and away from the user so that smoke and vapor emitted therefrom does not bother a user.

A bottom shelf having opposed sides is directly conjoined to an interior surface of the body. Such a bottom shelf is suitably spaced along a horizontal plane within the cavity. A grill is removably positional on the serrated layer such that the grill becomes disposed at a predetermined height for intercalating the smokers therebetween.

The flame generating mechanism includes a burner directly mounted to the cooking section and situated subjacent the grill and a flexible conduit having opposed end portions is directly coupled to the burner and the gas supply source. The burner conduit and the steam conduit provide separate quantities of gas to the flame generating mechanism and the steam generating mechanism so that the device can independently control a cooking temperature and a humidity level within the cavity during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The apparatus of this invention is referred to generally in FIGS. 1-9 by the reference numeral 10 and is intended to provide a combined steamer and smoker accessory for barbecue grills. It should be understood that the apparatus 10 may be used to steam and cook many different food items, and should not be limited only to use with conventional barbecued foods.

Figures 8, 9:
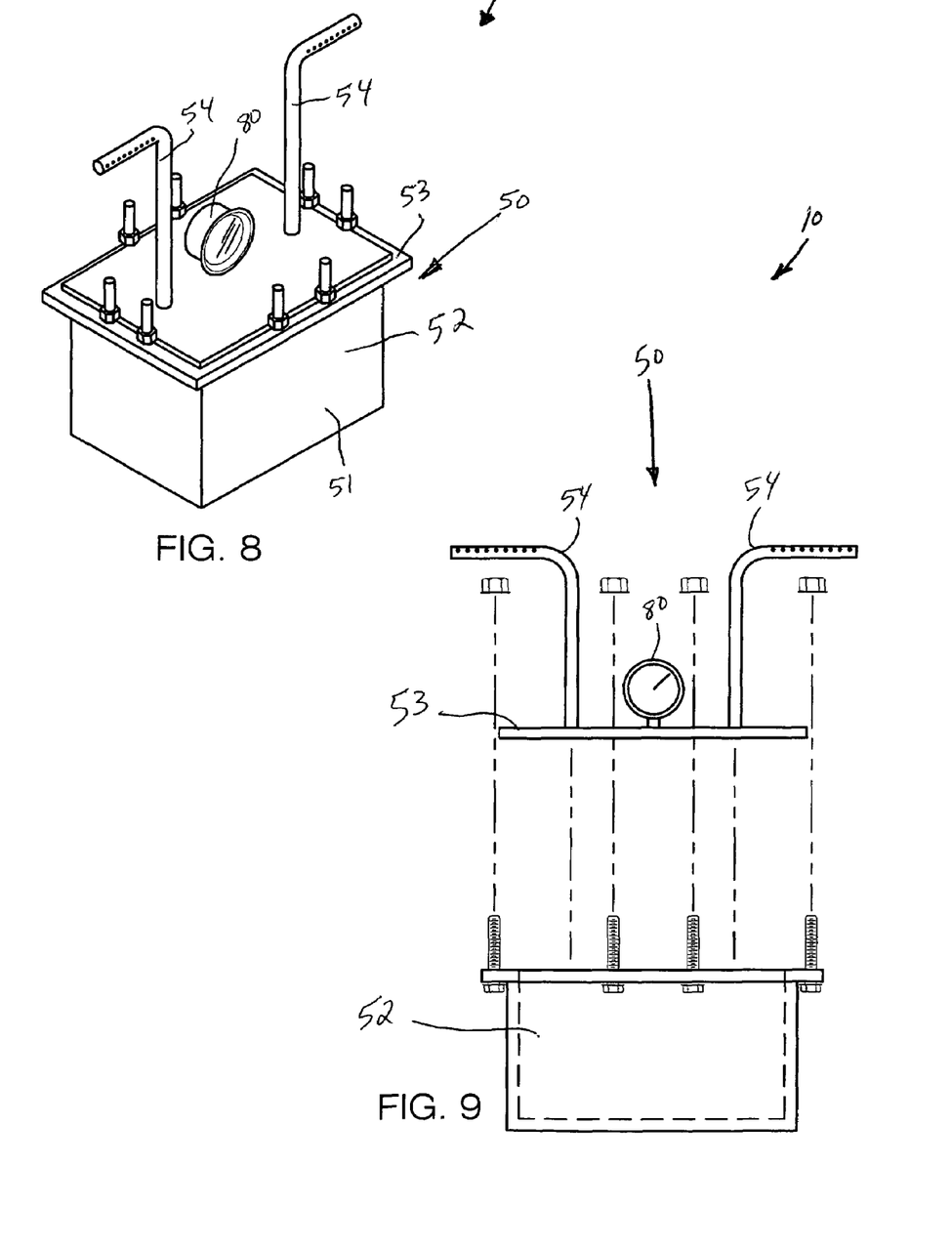
FIG. 8 is a perspective view of the steam generating mechanism, in accordance with the present invention.
FIG. 9 is a partially exploded side elevational view of the steam generating mechanism shown in FIG. 8.

Initially referring to FIGS. 8 and 9, in a preferred embodiment, the device 10 includes a mechanism 50 for generating a selected quantity of steam upwardly into the cooking section such that the foodstuff will become saturated with the steam during cooking operations. Such a steam generating mechanism 50 includes a reservoir 51 including a base member 52 and a lid 53 tightly and securely fastened directly thereto. The lid 53 maintains an air tight relationship with the base member 52 for preventing pressurized steam from escaping the base member 52.

Such a steam generating mechanism 50 may be filled with any type of liquid, such as a tenderizer, a marinating mixture, liquid smoke, beer, vinegar, etc. keeping meats juicy, moist and tender. In addition, such steam would add a hint of flavor to foods cooked on the grill for a better tasting meal. After grilling, the generated steam would ease the task of cleaning the grill grate. Such a grate could be easily wiped clean with a paper towel or other disposable cleaning material. Such a steam generating mechanism 50 could be produced in various sizes and styles to fit any type of grill, as is obvious to one having ordinary skill in the art.

Still referring to FIGS. 8 and 9, a plurality of rigid exhausts 54 are directly conjoined, with no intervening elements, to the lid 53 and in fluid communication with the base member 52 such that the steam is directed upwardly. A flexible conduit 55 having opposed end portions 56 is directly connected, with no intervening elements, to a gas supply source and the steam generating mechanism 50 respectively, as shown in FIG. 2.

Figure 2:
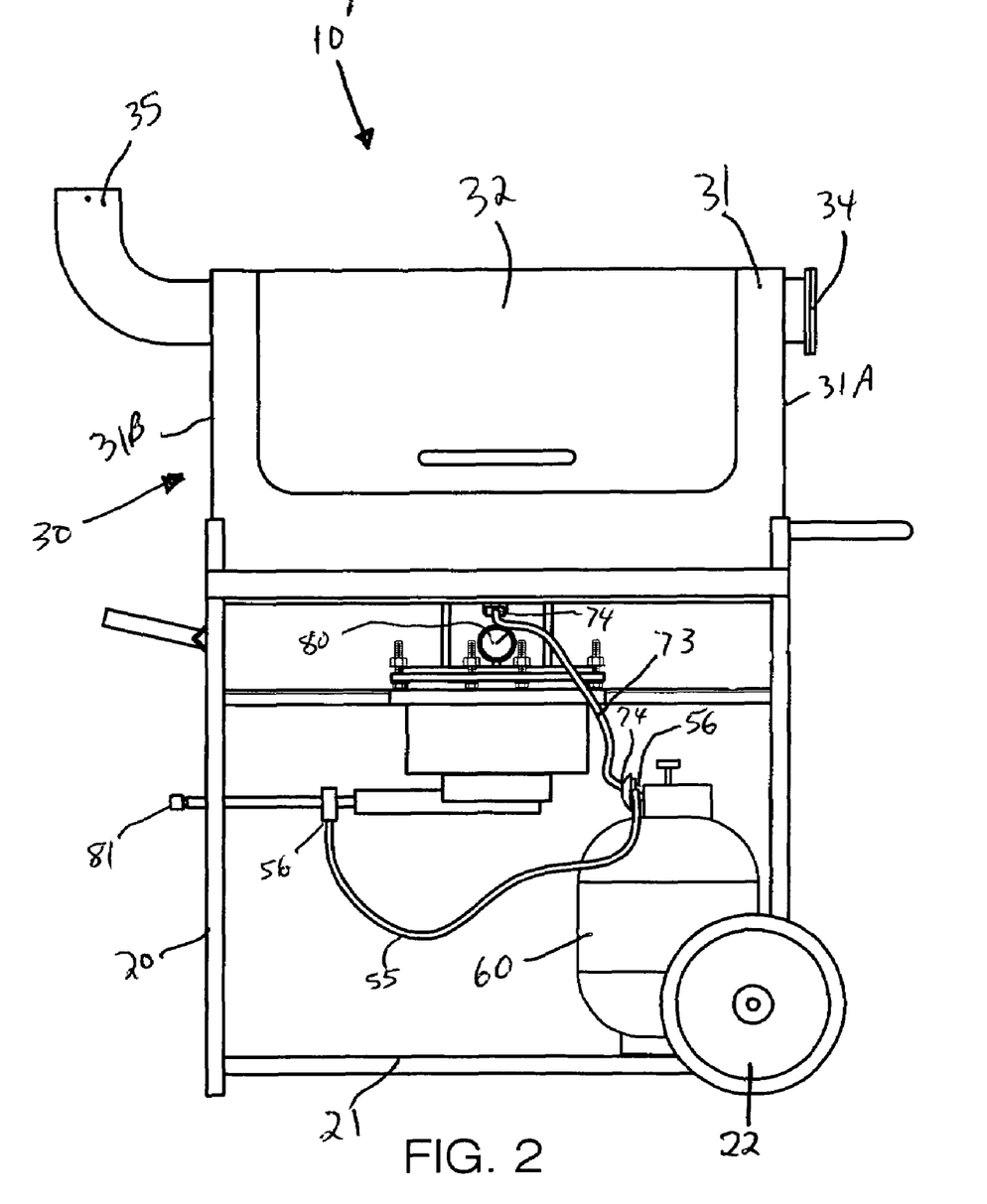
FIG. 2 front elevational view of the alternate embodiment shown in FIG. 1.
Figure 3:
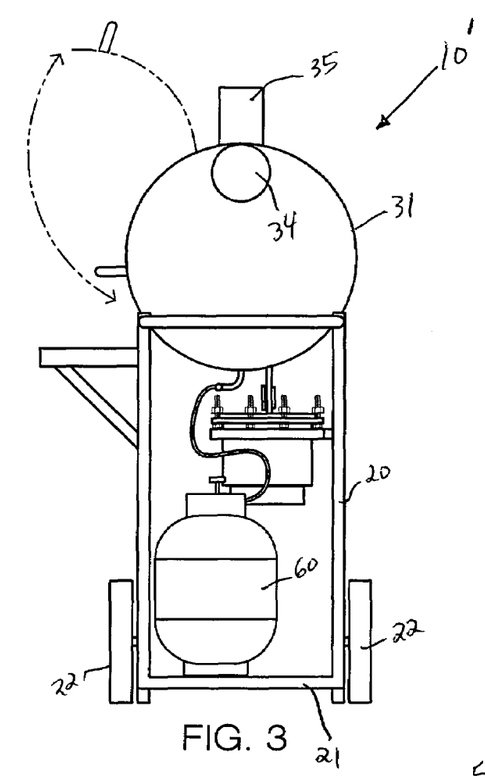
FIG. 3 is a right side elevational view of the alternate embodiment illustrating the pivotal movement of the access door.
Figure 4:
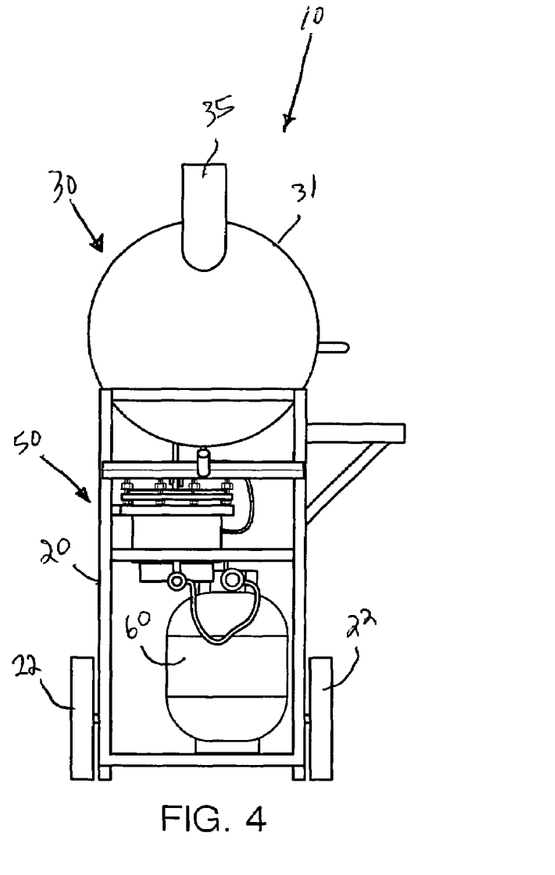
FIG. 4 is a left side elevational view of the alternate embodiment shown in FIG. 1.
Figure 5:
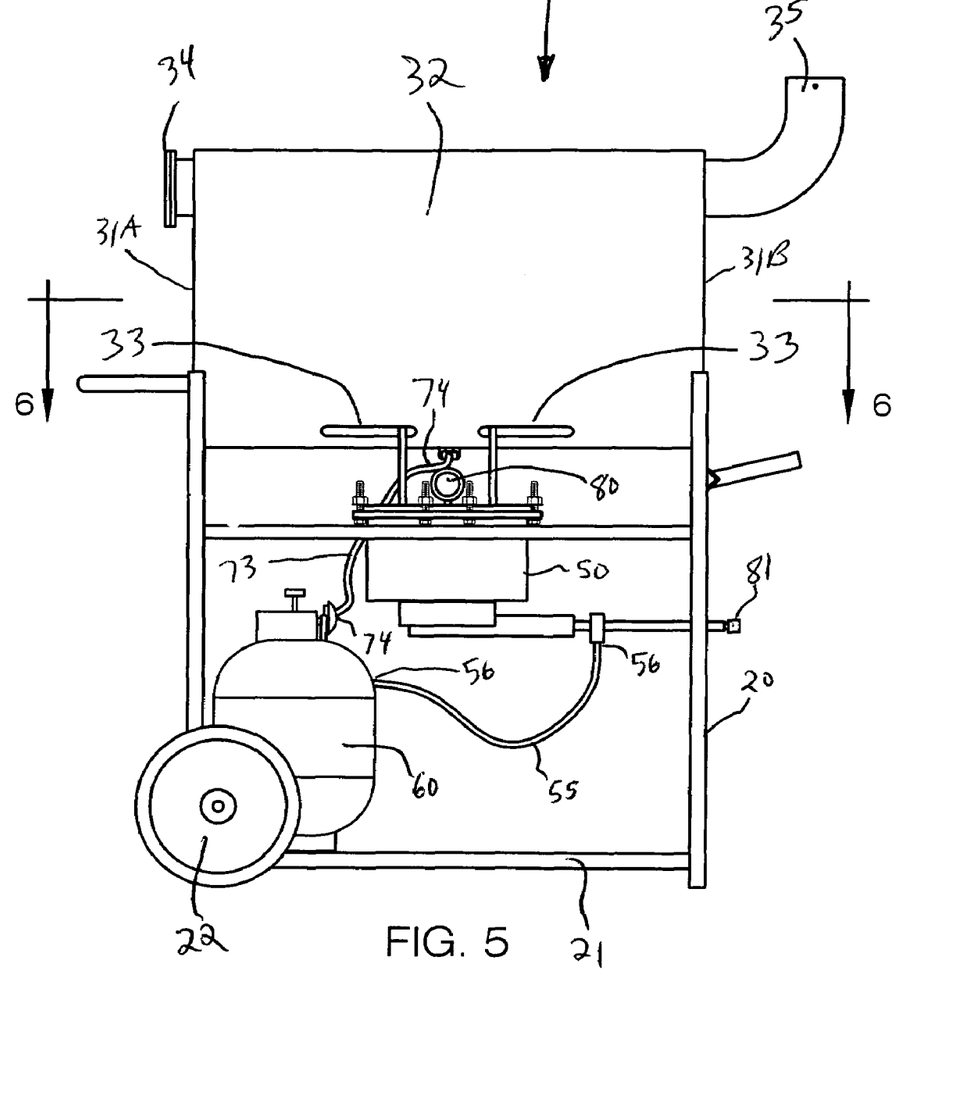
FIG. 5 is a rear elevational view of the alternate embodiment shown in FIG. 1.

Referring to FIGS. 2 and 5, a pressure gauge 80 is operably attached with the lid 53 for measuring the steam pressure during operating conditions and a controller 81 is operably connected to the conduit 55 such that the user can selectively adjust a temperature of the steam as desired during cooking operations. Such a controller 81 extends outwardly and is readily accessible by the user.

Figure 7:
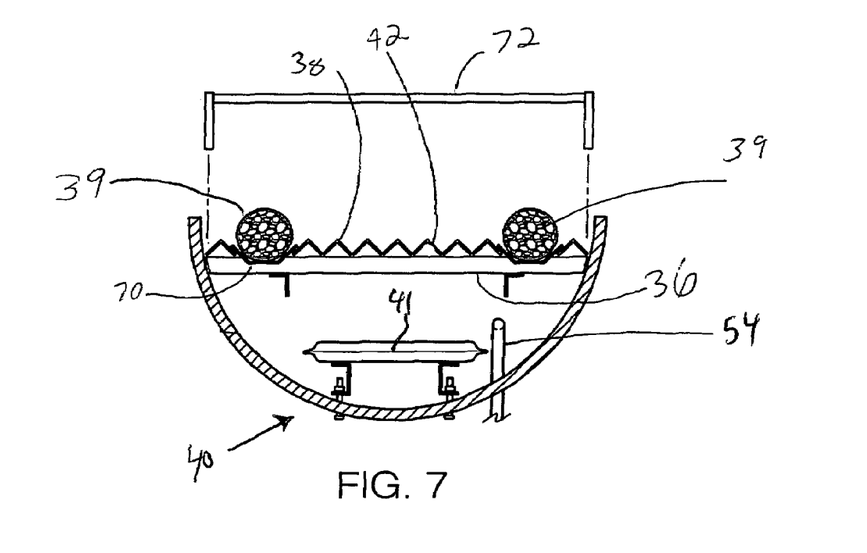
FIG. 7 is a cross-sectional view of the cooking section, taken along line 7-7.

Referring to FIG. 7, the device 10 further includes a serrated layer 38 for receiving foodstuff thereon during operating conditions and a plurality of smokers 39. The serrated layer 38 includes a plurality of juxtaposed and spaced angle members 42 having a substantially pyramid shape directly conjoined, with no intervening elements such that a linear opening runs along a longitudinal axis thereof and between the angle members 42. The serrated layer 38 further includes a plurality of oppositely seated support tabs 70 for supporting the smokers 39. Such a serrated layer 38 is removable from the device 10 upon manipulation of the support tabs 70 to allow for easy cleaning of the serrated layer.

There is a one inch gap between the tabs 70 and the serrated layer 38 that the smokers 39 cover to prevent flare-ups. The smokers 39 are inserted upon the support tabs 70 during operating conditions, if smoker activity is not required the smokers 39 are left empty and allowed to remain in the device 10 due to the fact that the smokers 39 prevent flare up through the support tabs 70, thereby ensuring proper cooking and safety. The smokers 39 are preferably round so that heat travels around them and there are no cold spots, thus enabling a user to cook directly over them.

Figure 6:
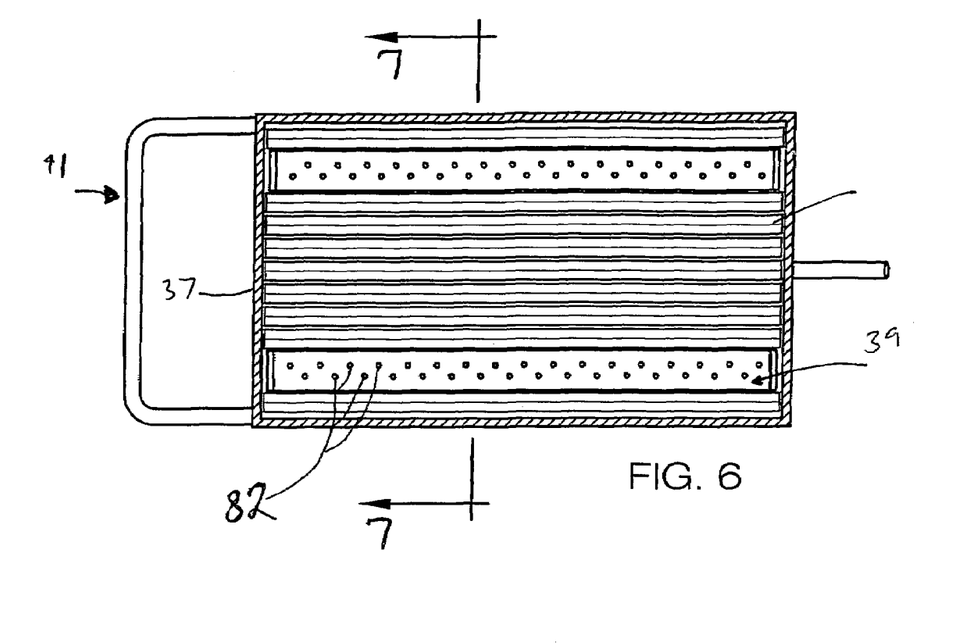
FIG. 6 is a top plan view of the cooking section.

Referring to FIGS. 6 and 7, the plurality of smokers 39 have a substantially cylindrical shape and a plurality of apertures 82 spaced about an outer surface 37 and extending along a length thereof. Such smokers 39 receive a plurality of wood chips therein for adding flavor to foodstuff. If a user does not desire smoke or smoke flavor, no wood chips are put into the smokers 39.

Referring to FIGS. 1-5, in an alternate embodiment, the device 10' includes a frame 20 positioned on a ground surface and having a centrally disposed longitudinal axis. Such a frame 20 includes a planar platform 21 sized and shaped for extending along an entire longitudinal length of the frame 20 and centrally registered with the axis. The frame 20 further includes a plurality of wheels 22 directly connected, with no intervening elements, thereto and positioned adjacent the platform 21 for assisting the user to readily transport the device between remote locations. Such a frame 20 and platform 21 are preferably formed from aluminum or galvanized sheet metal for their light weight durability, and resistance to corrosion in an outdoor environment, but may be formed from any suitable material. A cooking section 30 is directly mounted on the frame 20 and receives the foodstuff thereon during operating conditions.

In such an embodiment, the device 10' further includes a mechanism 40 for selectively generating a flame for cooking the foodstuff seated in the cooking section and a mechanism 50 for generating a selected quantity of steam upwardly into the cooking section 30 such that the foodstuff will become saturated with the steam during cooking operations.

Still referring to FIGS. 1-5, a gas supply source 60 is supported on the platform 21 and positioned beneath the cooking section. Such a platform 21 is essential to the operation of the device 10 because it maintains the gas supply source 60 at a stable position during operating conditions and provides stability and rigidity to the device 10 so that it is not easily toppled over in windy conditions, endangering those around them. Such a gas supply source 60 is independently and directly connected, with no intervening elements, to the steam generating mechanism 50 and the flame generating mechanism 41 respectively such that a user can independently control the quantity of steam and flames supplied to the cooking section.

Figure 1:
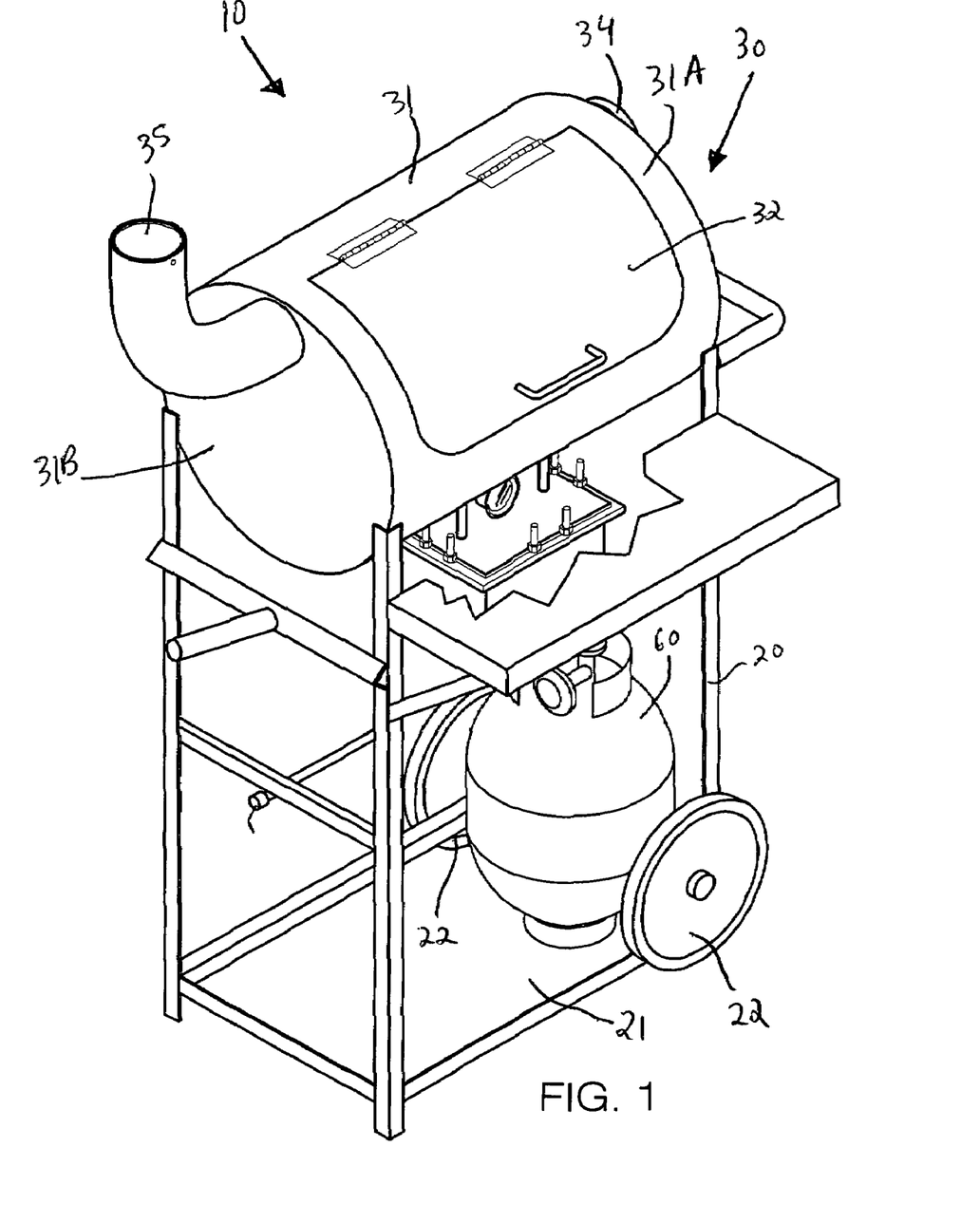
FIG. 1 is a perspective view of an alternate embodiment of the present invention showing a combined barbecue grill and smoker.

Referring to FIGS. 1 and 2, the cooking section 30 has a barrel shape to better accommodate large meats and foodstuff such as turkeys and chickens, and includes a unitary body 31 provided with an access door 32 pivotally and directly connected thereto, with no intervening elements. Such an access door 32 is critical to the operation of the device 10 so that meats can be rotated and readily removed when done without releasing large quantities of smoke and steam needed for adding flavor thereto. The body 31 has a plurality of linear slots 33 formed along a bottom region thereof and extending parallel to the axis.

An air intake port 34 is situated on one end portion 31A of the body 31 for channeling fresh air into a cavity of the body 31. A flue 35 is directly connected, with no intervening elements, to another end portion 31B of the body 31 for conveying stagnant air out of the body during cooking operations. Such a flue 35 has an elbow shape directed upwardly and away from the user so that smoke and vapor emitted therefrom does not bother a user.

Referring to FIGS. 1-5, a bottom shelf 21 having opposed sides is directly conjoined, with no intervening elements, to an interior surface of the body 31. Such a bottom shelf 21 is suitably spaced along a horizontal plane within the cavity. A grill 72 is removably positional on the serrated layer 38 such that the grill 72 becomes disposed at a predetermined height for intercalating the smokers 39 therebetween.

Referring to FIG. 7, the flame generating mechanism 40 includes a burner 41 directly mounted to the cooking section 30 and situated subjacent the grill 72 and a flexible conduit 73 having opposed end portions 74 is directly coupled to the burner 41 and the gas supply source 60. The burner conduit 73 and the steam conduit 55 provide separate quantities of gas to the flame generating mechanism 40 and the steam generating mechanism 50 so that the device 10' can independently control a cooking temperature and a humidity level within the cavity during operating conditions.

Such a device 10 would appeal to barbecuers who enjoy cooking outdoors and would be portable so that campers, hunters and picnickers could easily transport it to remote locations. Such a device could also be used for entertaining friends and family at reunions, parties, special occasions and sporting events. The simplistic design thereof would ensure reasonable pricing so that consumers could easily afford it.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A device for allowing a user to simultaneously smoke and steam foodstuff on an outdoor grill so that the foodstuff does not dry out during cooking procedures, said device comprising:

means for generating a selected quantity of steam upwardly such that the foodstuff will become saturated with the steam during cooking operations, said steam generating means comprising
  a reservoir including a base member and a lid tightly and securely fastened directly thereto, said lid maintaining an air tight relationship with said base member for preventing pressurized steam from escaping said base member;
  a plurality of rigid exhausts directly conjoined to said lid and in fluid communication with said base member such that the steam is directed upwardly;
  a flexible conduit having opposed end portions directly connected to a gas supply source and said steam generating means respectively;
  a pressure gauge operably attached with said lid for measuring the steam pressure during operating conditions; and
  a controller operably connected to said conduit such that the user can selectively adjust a temperature of the steam as desired during cooking operations, said controller extending outwardly and being readily accessible by the user;
 a serrated layer for receiving foodstuff thereon during operating conditions; and
 a plurality of smokers;
 wherein said serrated layer includes a plurality of juxtaposed and spaced angle members having a substantially pyramid shape, said angle members being directly conjoined such that a linear opening runs along a longitudinal axis thereof and between said angle members;
 wherein said serrated layer further comprises a plurality of oppositely seated support tabs for supporting said smokers.

2. The device of claim 1, wherein said plurality of smokers have a substantially cylindrical shape, said smokers further having a plurality of apertures spaced about an outer surface and extending along a length thereof, said smokers for receiving a plurality of wood chips therein for adding flavor to foodstuff.

3. A device for allowing a user to simultaneously smoke and steam foodstuff on an outdoor grill so that the foodstuff does not dry out during cooking procedures, said device comprising:

a frame positioned on a ground surface and including a centrally disposed longitudinal axis, said frame including a planar platform sized and shaped for extending along an entire longitudinal length of said frame and centrally registered with the axis, said frame including a plurality of wheels directly connected thereto and positioned adjacent said platform for assisting the user to readily transport said device between remote locations;
 a cooking section directly mounted on said frame, said cooking section receiving the foodstuff thereon during operating conditions;
 means for selectively generating a flame for cooking the foodstuff seated in said cooking section;
 means for generating a selected quantity of steam upwardly into said cooking section such that the foodstuff will become saturated with the steam during cooking operations; and
 a gas supply source supported on said platform and positioned beneath said cooking section, said gas supply source being independently and directly connected to said steam generating means and said flame generating means respectively such that a user can independently control the quantity of steam and flames supplied to said cooking section;
 wherein said cooking section has a barrel shape and comprises:
  a unitary body provided with an access door pivotally connected thereto, said body having a plurality of linear slots formed along a bottom region thereof and extending parallel to the axis;
  an air intake port situated on one end portion of said body for channeling fresh air into a cavity of said body;
  a flue directly connected to another end portion of said body for conveying stagnant air out of said body during cooking operations, said flue having an elbow shape directed upwardly and away from the user;
  a bottom shelf having opposed sides directly conjoined to an interior surface of said body, said bottom shelf being suitably spaced along a horizontal plane within the cavity;
  a serrated layer for receiving foodstuff thereon during operating conditions;
  a plurality of smokers; and
  a grill removably positional on said serrated layer such that said grill becomes disposed at a predetermined height for intercalating the smokers therebetween.

4. The device of claim 3, wherein said steam generating means comprises:

a reservoir seated below said cooking section and directly connected to said frame such that said reservoir is securely maintained at an elevated position above said platform, said reservoir including a base member and a lid tightly and securely fastened directly thereto, said lid maintaining an air tight relationship with said base member for preventing pressurized steam from escaping said base member;
 a plurality of rigid exhausts directly conjoined to said lid and in fluid communication with said base member such that the steam is directed upwardly into said cooking section;
 a flexible conduit having opposed end portions directly connected to said gas supply source and said steam generating means respectively;
 a pressure gauge operably attached with said lid for measuring the steam pressure during operating conditions; and
 a controller operably connected to said conduit such that the user can selectively adjust a temperature of the steam as desired during cooking operations, said controller extending outwardly from said frame and being readily accessible by the user.

5. The device of claim 3, said flame generating means comprising:

a burner directly mounted to said cooking section and situated subjacent said grill; and
 a flexible conduit having opposed end portions directly coupled to said burner and said gas supply source;
 wherein said burner conduit and said steam conduit provide separate quantities of gas to said flame generating means and said steam generating means so that said device can independently control a cooking temperature and a humidity level within the cavity during operating conditions.

6. The device of claim 3, wherein said serrated layer includes a plurality of juxtaposed and spaced angle members having a substantially pyramid shape, said angle members being directly conjoined such that a linear opening runs along a longitudinal axis thereof and between said angle members.

7. The device of claim 6, wherein said serrated layer further comprises a plurality of oppositely seated support tabs for supporting said smokers.

8. The device of claim 3, wherein said plurality of smokers have a substantially cylindrical shape, said smokers further having a plurality of apertures spaced about an outer surface and extending along a length thereof, said smokers for receiving a plurality of wood chips therein for adding flavor to foodstuff.

\* \* \* \* \*